(12) United States Patent
Hudson

(10) Patent No.: US 6,545,773 B1
(45) Date of Patent: Apr. 8, 2003

(54) COMPENSATION FOR PRINT-DIRECTION INDUCED HUE SHIFT USING DEPLETION

(75) Inventor: Kevin R Hudson, Mt. Circle Camas, WA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/260,982

(22) Filed: Mar. 1, 1999

(51) Int. Cl.[7] .................. G06K 15/00; G06K 9/00; H04N 1/46; G03F 3/08; B41J 2/15

(52) U.S. Cl. ............... 358/3.23; 358/3.03; 358/3.14; 358/3.26; 358/502; 358/518; 358/530; 347/20; 347/24; 347/54; 347/75; 347/81; 347/86; 347/174; 347/184; 347/214; 382/167

(58) Field of Search .............. 358/3.03, 3.14, 358/3.18, 3.23, 3.26, 502, 518, 520, 530, 534, 535, 536, 540, 515; 347/20, 24, 54, 75, 81, 86, 174, 184, 214; 382/167

(56) References Cited

U.S. PATENT DOCUMENTS 5,574,832 A   11/1996   Towery et al.
6,057,933 A * 5/2000   Hudson et al. ............. 358/1.9

FOREIGN PATENT DOCUMENTS

EP   0863 480   9/1998

OTHER PUBLICATIONS

European Patent Office Search Report date Feb. 7, 2001.

* cited by examiner

*Primary Examiner*—Edward Coles
*Assistant Examiner*—Monica Mitchell

(57) ABSTRACT

Color printheads in a color inkjet printer are in a fixed order in the scanning carriage, which causes the colors to be printed in a different order when the carriage is scanned in an opposite direction. The different print order may result in a perceptible change in hue between passes in bi-directional printing. Depleted shingle masks are substituted for the nominal ones, based on print direction, at the shingle masking stage, to compensate for print-direction-induced hue shift. A look-up table indexed by a composite color tone value providing a depletion probability and a halftoning error diffusion value are used in determining when depleted shingle masks are to be invoked.

24 Claims, 5 Drawing Sheets

COMPENSATION FOR PRINT-DIRECTION INDUCED HUE SHIFT USING DEPLETION

FIELD OF THE INVENTION

This invention relates to inkjet printers and, in particular, to a printing technique for reducing direction-induced hue shift in a color inkjet printer.

BACKGROUND

Inkjet printers are well known and extremely popular. Details of a particular inkjet printer are described in U.S. Pat. No. 5,648,806, entitled Stable Substrate Structure for a Wide Swath Nozzle Array in a High Resolution Inkjet Printer, by Steven Steinfeld et al., assigned to the present assignee and incorporated herein by reference.

An inkjet printer ejects fine droplets of ink onto a print medium, typically paper, from precisely formed nozzles in one or more printheads. High quality color inkjet printers include printheads for the three subtractive primary color inks, cyan, magenta, and yellow, and a separate printhead for black ink. One type of color inkjet printer incorporates a separate replaceable print cartridge for each of the four colors of ink installed in a scanning carriage. Another type of color inkjet printer incorporates two, three, or four different color printheads in the same print cartridge. The order of printheads in the carriage is typically black on the left side or right side of the primary color cartridges, with the order of the primary color cartridges being arbitrary.

When printing a color image, droplets, or dots, of the three primary colors are printed in various combinations to achieve the desired color tones, or hues, to reproduce the original color image. Multiple dots of the same color may be used for a single color spot to increase the intensity of that color in the color spot. A color image to be printed is typically available in the memory of a computer connected to the printer, in a continuous color scale version of the color image, suitable for display on a computer monitor. The method of converting the continuous image to a representation in terms of discrete dots is commonly referred to as halftoning. Halftoning methods are described in the book Digital Halftoning by Robert Ulichney, the MIT Press, 1987, incorporated herein by reference.

In an inkjet printer, printing is performed as the printhead is scanned across a print medium. Since the printheads are generally much smaller than the image to be printed, the image is divided into regions of appropriate size to be printed in a pass of the scanning carriage across the print medium. The process of creating instructions to fire specific inkjet nozzles to print specific regions of the color image is often termed shingle masking or shingling. Shingling is also used to enhance print quality by laying down the ink dots in several passes.

In order to achieve high throughput, that is, to maximize the number of pages printed per minute, printing is performed bi-directionally. In bi-directional printing, each pass is printed in the direction opposite to that of the previous pass. Consider the case of single pass printing. A first region is printed as the carriage is scanned in a first direction across the print medium. Then the medium is advanced and the carriage is scanned across the medium in the opposite direction to print an adjacent region. Since the color printheads are in a fixed order in the carriage, when the carriage is scanned in the opposite direction, the component inks are printed on the paper in reverse order.

For example, if the pen order on the carriage is, from left to right, black, cyan, magenta, yellow, then when the carriage is scanned from left to right, yellow is printed first; then magenta is printed over yellow; cyan is printed over magenta; and finally black is printed over cyan. When the carriage is scanned from right to left, black is printed first, over which cyan, magenta, and yellow are printed respectively. This reversal of printing order between adjacent passes may result in a perceptible change in hue, or hue shift between passes. To produce a dark red color, for example, magenta and yellow dots are printed. As the carriage is scanned from left to right, magenta is printed over yellow. As the carriage is scanned from right to left, yellow is printed over magenta, which may produce a color with a yellowish cast, as compared to the color printed with magenta over yellow.

What is needed is a method for reducing the perceptible hue shift arising from bi-directional printing in a color inkjet printer.

SUMMARY

Depleted shingle masks are substituted for the nominal ones, based on print direction, at the shingle masking stage, to compensate for print-direction-induced hue shift in a color inkjet printer. When direction-dependent depleted shingle masks are used, the number of ink drops of a given color printed per unit area depends on the direction in which the printhead is scanned across the print medium. According to an embodiment of the invention, a look-up table indexed by a composite color tone value formed from the original continuous color scale is used to provide a depletion probability. The depletion probability is defined as the probability of selecting a print-direction-dependent depleted shingle mask which, in turn, results in an appropriate overall level of depletion. In this embodiment, the depletion probability is compared with the error diffusion threshold value used in halftoning the continuous image to discrete dots to determine when the shingle mask pair associated with depleted ink volume is to be invoked. The method can be used with any halftoning process that includes an error diffusion threshold value or other random threshold generator.

DETAILED DESCRIPTION

A method of compensating for print-direction-induced hue shift in a color inkjet printer substitutes depleted shingle masks for the nominal ones, based on print direction.

Figure 1:
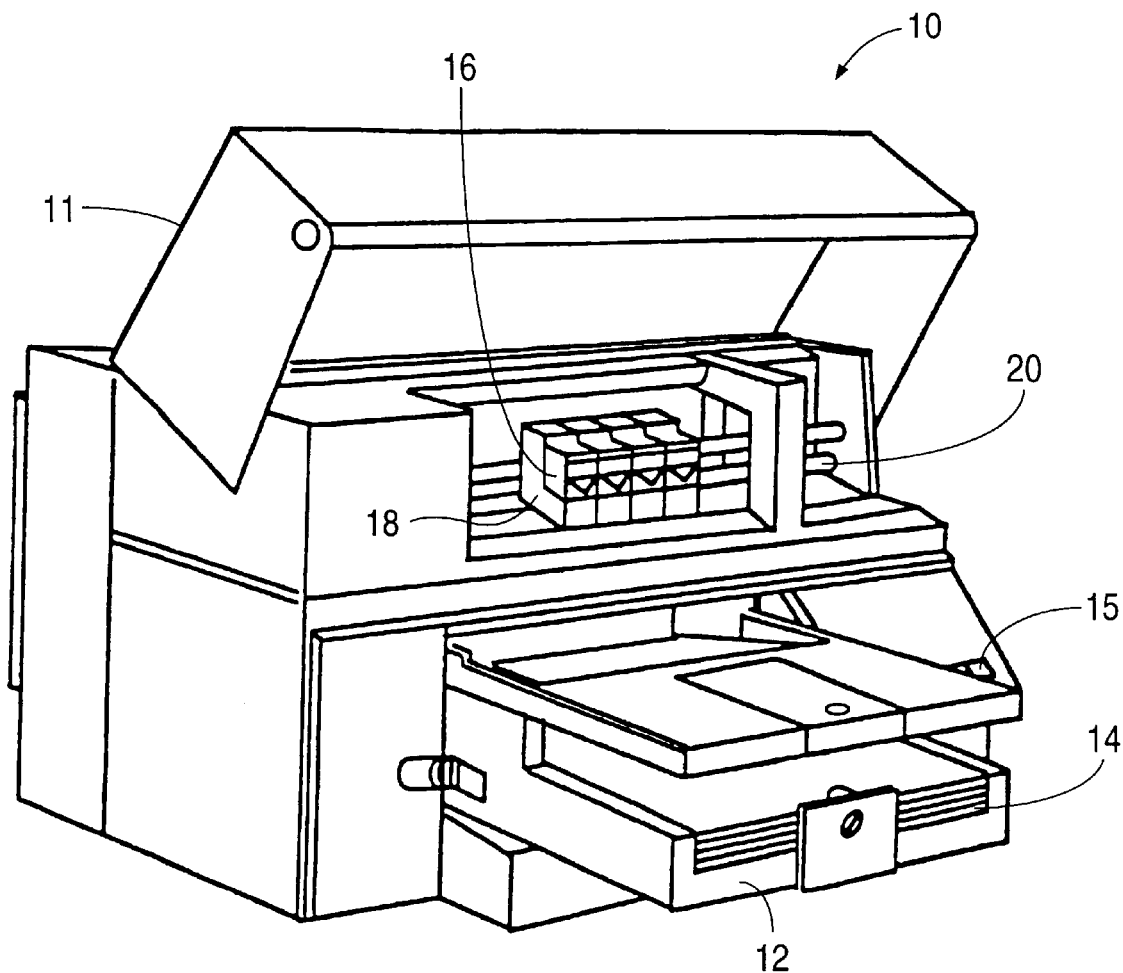
FIG. 1 illustrates one of many examples of an inkjet printer that could incorporate the present invention.
Figure 2:
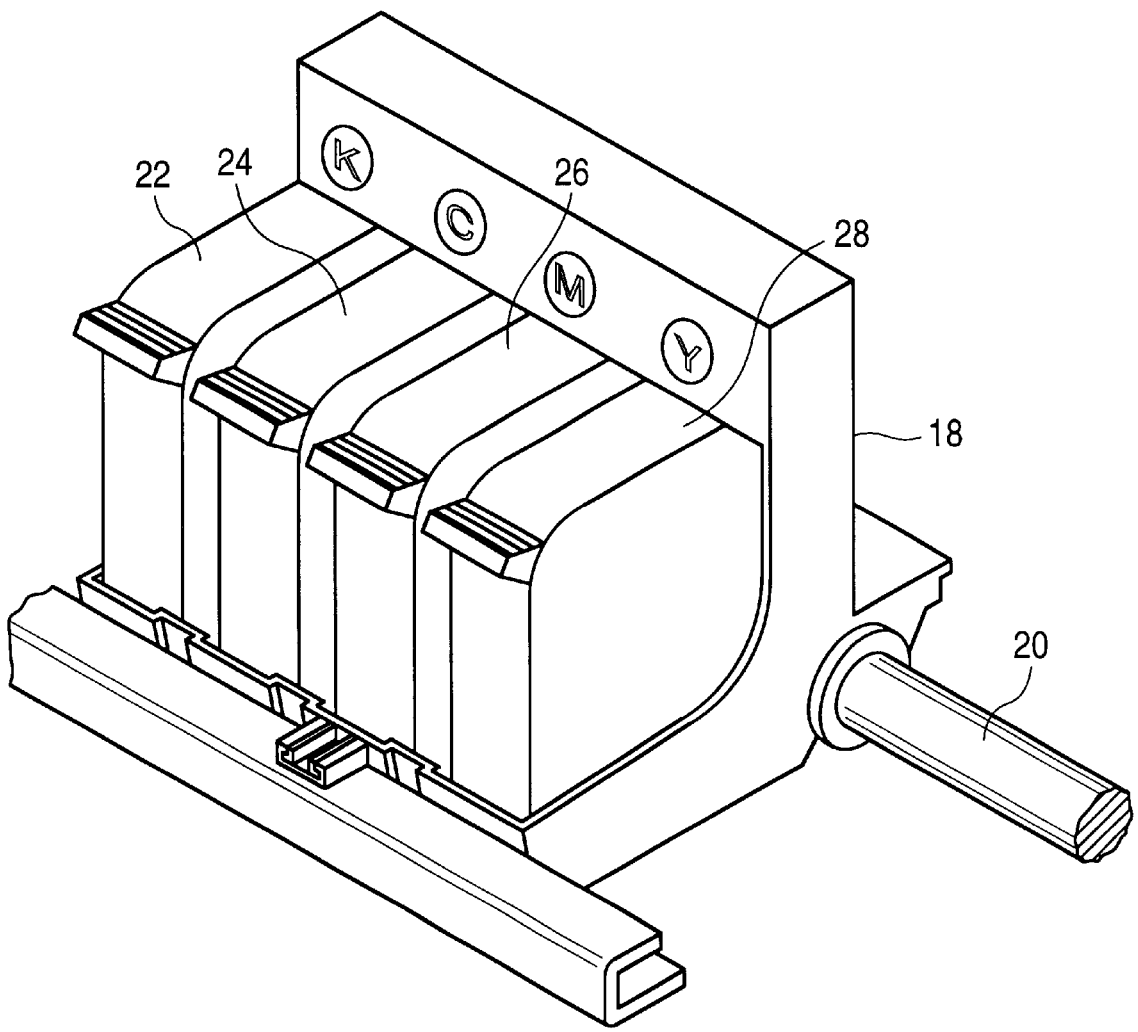
FIG. 2 illustrates the scanning carriage in the printer of FIG. 1 and the order of print cartridges in the carriage.

The method can be applied, for example, in color inkjet printer 10, illustrated in FIG. 1. The color inkjet printer includes a cover 11, a paper tray 12 for holding virgin paper 14, an output tray for receiving the printed pages 15, color ink print cartridges 16, and a scanning carriage 18 for sliding along a slide bar 20 while dots are being printed on the paper. In one embodiment, the color print cartridges 16 include cyan (C) 24, magenta (M) 26, yellow (Y) 28, and black (K) 22 ink print cartridges. The cartridges are ordered in scanning carriage 18, from left to right, K, C, M, Y as shown in FIG. 2. Other combinations of ink, such as CMY, may also be used.

Figure 3:
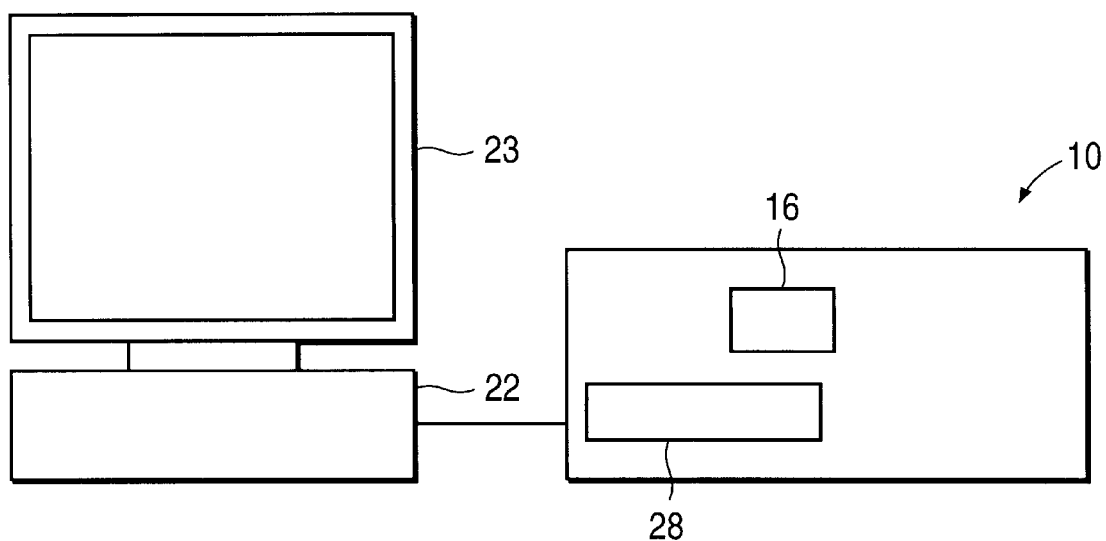
FIG. 3 illustrates a computer connected to an inkjet printer, where the computer and the printer both can carry out the method of compensating for print-direction-induced hue shift, according to embodiments of the present invention.

FIG. 3 is a schematic diagram of a printing system which includes a host computer 22, a monitor 23 (e.g., a CRT), and a printer, for example, printer 10. Printer 10 also includes printer controller 28 for controlling the printing of dots by print cartridges 16. The print cartridges may print at 300 dots-per-inch (DPI), 600 DPI, 1200 DPI, or any other resolution. If multiple drops of the same color ink are to be deposited over the same pixel position to print a multi-drop ink spot on a medium, the carriage containing print cartridges 16 may make multiple scans across the medium to print such overlapping dots.

Figure 4:
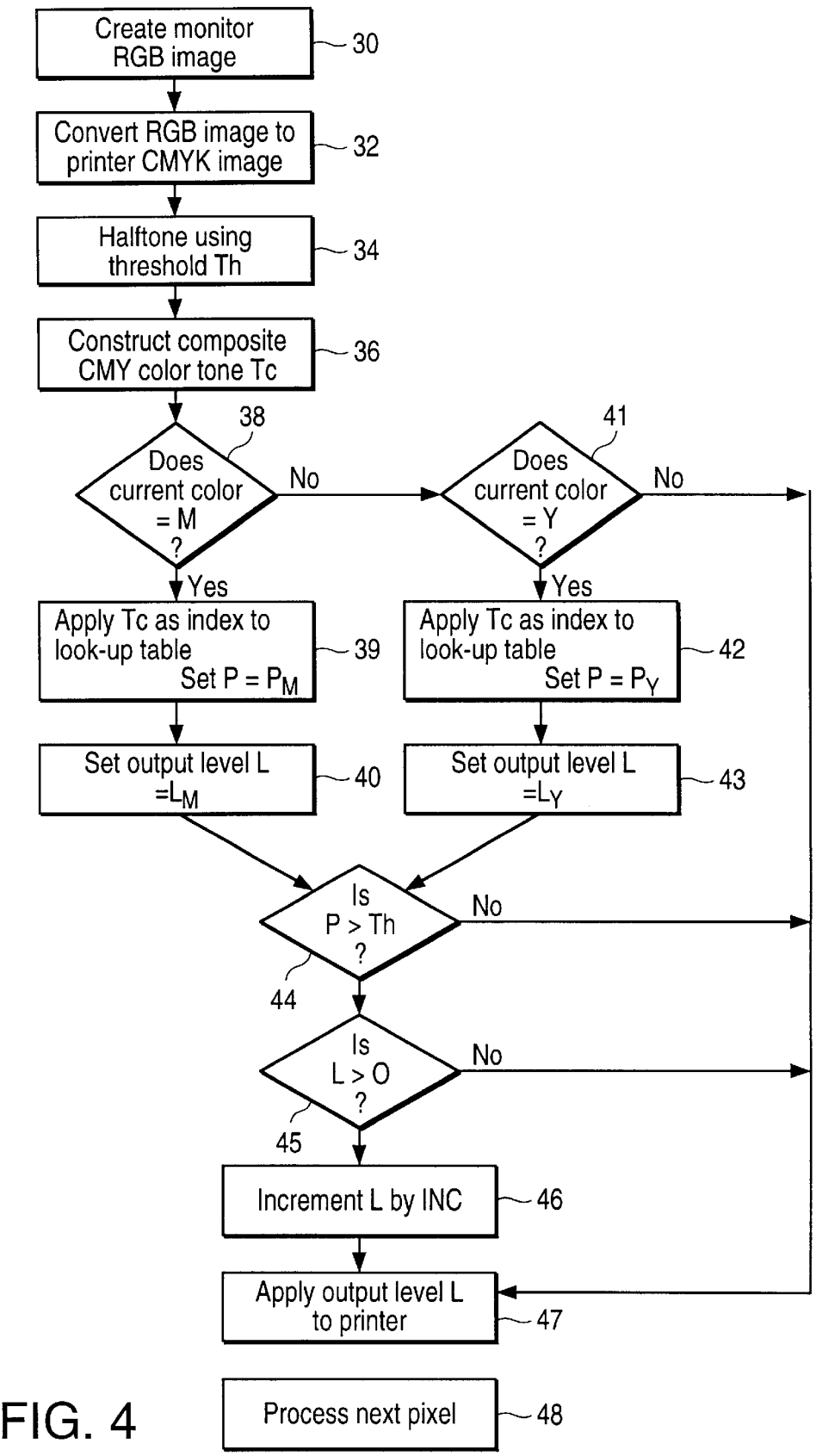
FIG. 4 is a flow chart illustrating the basic steps in the hue shift compensation method.
Figure 5:
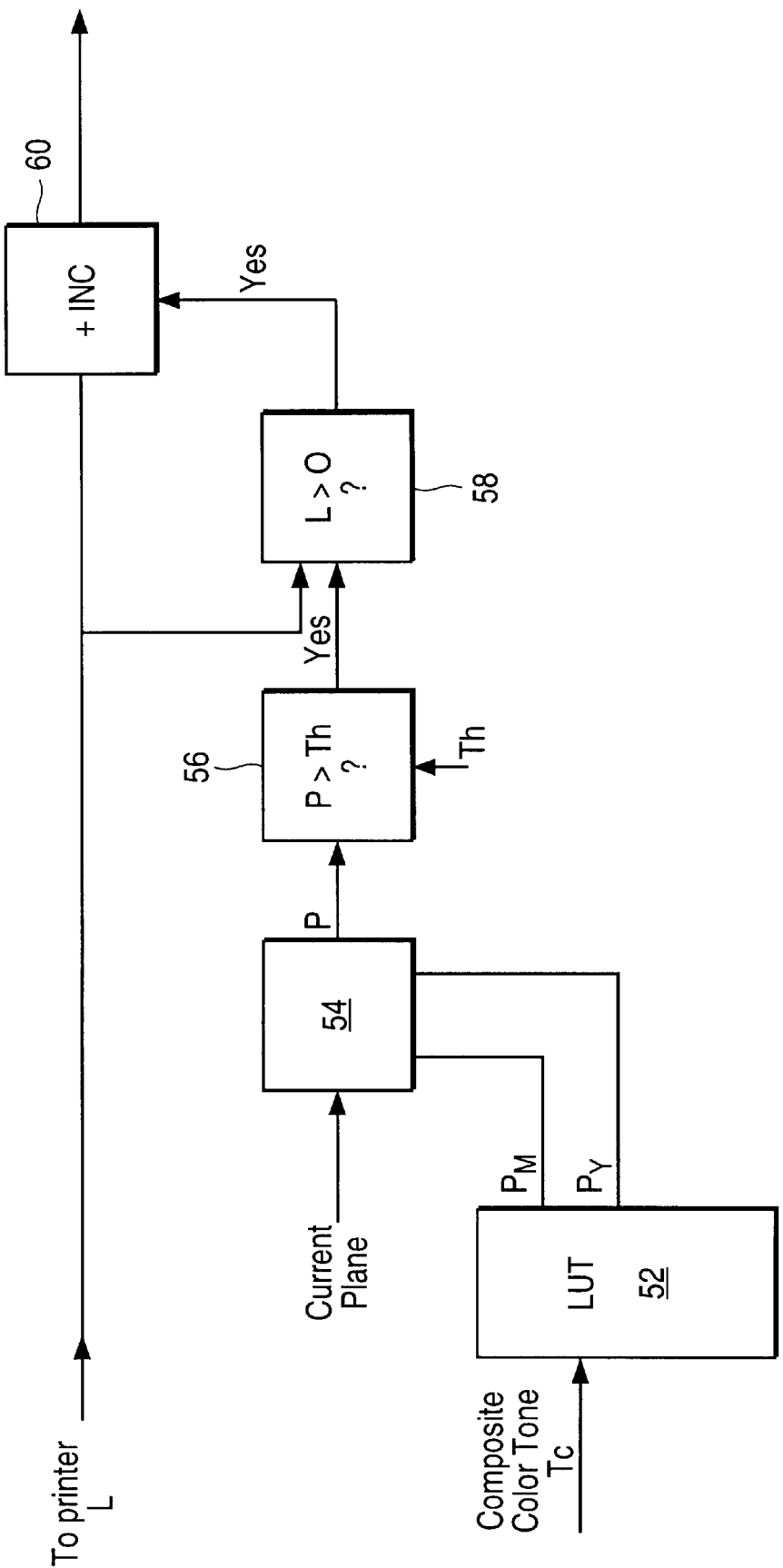
FIG. 5 illustrates an implementation of the hue shift compensation method.

FIG. 4 is a flowchart illustrating the general method carried out by the implementation of FIG. 5. It is assumed in the flowchart of FIG. 4 that the image to be printed by the printer is first generated in a computer; however, the original image may be generated by any other means.

At step 30 of FIG. 4, a color image is generated by a computer and displayed on a monitor using conventional means. A typical computer generates signals for a monitor to display the additive primary colors, red, green, and blue (RGB), which can be combined to produce millions of colors and also black. Typically, there are 256 levels of intensity for each primary color, so that each of the primary colors may be identified using an 8-bit byte. A typical computer monitor displays images at 75 dots per inch. A 24-bit RGB color image is held in the memory of computer 22 so that it can be displayed on monitor 23.

At step 32 of FIG. 4, the RGB image is converted to a CMYK image (assuming black ink is used) at the resolution of the printer 10.

At step 34, the CMYK image is halftoned to convert the image from 4-plane (CMYK), 8-bits per color, to an output color level (denoted L) at the DPI resolution of the printer. Printer 10 may be a 2-level, or binary, printer, in which case the output color level is designated 0 or 1, corresponding to on or off dots. Alternatively, printer 10 may be a 4-level printer. In this case, the output color level for a single ink is designated 0, 1, 2, or 3, corresponding to, for example, 0, 1, 2, and 3 drops, respectively, of a single color ink at each pixel location. Other correspondences between the color levels 0–3 and the drops per level may be used. In general, output color level 0 corresponds to 0 drops; for an n-level printer, the maximum output color level is n−1.

Halftoning methods commonly used in inkjet printing are based on error diffusion techniques. A well known error diffusion technique is described by R. Floyd and L. Steinberg in the paper Adaptive Algorithm for Spatial Gray Scale, SID Int'l. Sym. Digest of Tech. Papers, pp 36–37 (1975), incorporated herein by reference.

In error diffusion, the decision about whether or not to print a dot of a particular color (or how many overlapping dots of a color to print) is based not only on the intensity for that pixel but on what has happened before for previously processed neighboring pixels. At each point where a dot may be printed, the original image pixel intensity between 0 and 255, stored in the 8-bit per color CMYK image, as modified by the accumulated error for neighboring pixels, is compared to an error diffusion threshold value Th. The threshold value is scaled to range between 0 and 255 and may be selected from a table, fixed throughout the halftoning process, or pseudo-randomly selected. Halftoning processes are described, for example, in U.S. application Ser. No. 08/880,475, entitled Correlating Cyan and Magenta Planes for Error Diffusion Halftoning, by Gondek, and in U.S. application Ser. No. 08/961,047, entitled Table Based Fast Error Diffusion Halftoning Technique, by Hudson and Pritchard, both commonly assigned with the present application and incorporated herein by reference. Any halftoning process using an error diffusion threshold value Th can be used at step 34.

At step 36, a composite CMY color tone denoted $T_c$ is constructed by concatenating a certain number of the most significant bits of each of the C, M, and Y values of the CMYK image, that is, of the 32-bit input to step 34. For example; it may be determined that concatenating the three most significant bits of each color, resulting in a nine-bit number, provides sufficient resolution for hue compensation.

In the embodiment illustrated in FIGS. 4 and 5, hue compensation is performed for magenta and yellow inks only. The steps indicated by reference numerals 38–47 are performed separately for each color plane. At step 38, it is determined if the current color is magenta. If the current color is magenta, at step 39, the composite color tone $T_c$ is applied as an index to look-up table 52 to obtain a magenta depletion probability, $P_M$.

An example of look-up table 52 is given schematically in Table 1. In this example, the depletion probability is scaled to range from 0 to 256. In Table 1, the composite CMY color tone $T_c$ is given both in binary, (where the leftmost 3 bits are the three most significant bits of the C value, the middle 3 bits are the three most significant bits of the M value, and the rightmost 3 bits are the three most significant bits of the Y value), and in arabic notation. For implementation convenience, the depletion probability range coincides with the range of the error diffusion threshold values (Th) previously used in the halftoning process at step 34. As discussed in greater detail below, when this depletion probability exceeds the threshold value, depleted printing is implemented.

TABLE 1

Depletion Probability Look-Up Table

| Composite CMY Color Tone ($T_C$) | Magenta Depletion Probability | Yellow Depletion Probability |
|---|---|---|
| 000 000 001 (1) | 0 | 0 |
| 000 000 010 (2) | 0 | 0 |
| 000 000 011 (3) | 0 | 0 |
| 000 000 100 (4) | 0 | 0 |
| . | . | . |
| . | . | . |
| 000 111 101 (61) | 0 | 128 |
| 000 111 110 (62) | 0 | 192 |
| 000 111 111 (63) | 0 | 255 |
| . | . | . |
| . | . | . |
| 111 100 000 (480) | 120 | 0 |
| 111 100 001 (481) | 110 | 20 |
| 111 100 010 (482) | 100 | 64 |
| . | . | . |
| . | . | . |
| 111 111 111 (511) | 200 | 240 |

In Table 1, composite color tone $T_c$ of 1 to 4, in arabic notation, corresponds to a tone with only yellow turned "on". Therefore, there is no need for depletion and all the entries are zero. Composite color tone $T_c$ of 61 to 63 corresponds to magenta and yellow turned on. In this case, the yellow depletion probability is non-zero so that depleted printing will be implemented for yellow. For tones 480 to 481, which include components of all three colors, the table indicates magenta and yellow depletion. Finally, tone 511, which corresponds to a color that is nearly black, requires significant depletion of both magenta and yellow. The depletion probability table is developed experimentally by printing out a page of sample patches with different levels of depletion. Best matches are found which represent the appropriate level of depletion for a given composite tone.

The depletion probability, $P_M$, is stored as depletion probability, P, at logic operator 54. At step 40, the output level L is set to the current magenta level $L_m$. Steps 41–43, in FIG. 3, are performed when the current color is yellow, analogous to steps 38–40, described above for the current color magenta.

At step 44, the depletion probability P is compared to the threshold value Th by comparator 56 and at step 45, the current level L is compared with 0 by comparator 58. If both conditions are met, P>Th and L>0, L is incremented by summer 60, at step 46. For a 4-level printer, for example, the increment, INC, may be set equal to 3. In this example, then, the correspondence between original levels and depleted levels is given in Table 2 below.

TABLE 2

Output Level L

| Original Level | Depleted Level |
|---|---|
| 0 | 0 |
| 1 | 4 |
| 2 | 5 |
| 3 | 6 |

In an alternative embodiment, if both conditions are met, using summer 60, level L can be transformed by applying a look-up table, such as Table 2 above.

At step 47, the output level L is applied to the printer 10 and the next pixel is processed (step 48). Steps 34 to 47 in FIG. 4 are repeated for each color plane separately, for each pixel.

Typically, in inkjet printing, the image produced at step 34 includes all the information about how many dots of each color are to be printed at each pixel location on the medium and the locations of the dots. The information for multiple pixels is typically collected in a printer buffer prior to printing. The printer controller 28 (FIG. 3) decides when these dots should be printed (i.e. in a single pass or in multiple passes) at the shingle masking step. Multiple passes are advantageously used when multiple drops per pixel are to be printed and to hide printhead defects, for example, a non-functioning nozzle. A shingle mask describes the pattern of dots to be printed in a single pass. In the prior art, in a one-pass print mode, the same shingle mask is used for printing from left to right and for printing from right to left.

According to embodiments of the present invention, compensation for print-direction induced hue shift is accomplished at the shingle masking step. Output levels L, applied to the printer at step 47, equal to 1, 2, and 3, in the example of Table 2, are each associated with a specific nominal shingle mask, which is used independent of printing direction. Depleted output levels, 4, 5, and 6 are each associated with a specific pair of shingle masks, for example, a nominal mask for printing from left to right and a depleted mask for printing from right to left.

In one embodiment, for each level, the depleted shingle mask used for printing from right to left, causes fewer ink drops to be printed than the corresponding nominal shingle mask used for printing from left to right for the same output level. For the specific example of printing magenta and yellow at the same location, fewer dots of yellow ink may be printed when the printhead is scanned from right to left (yellow printed over magenta) than when the printhead is scanned from left to right to avoid a yellowish cast.

The potential need for depletion is identified just after the half-toning step, in advance of knowing the print direction. At the point of printing, when the print direction is determined, if need for depletion is indicated, by output levels 4, 5, or 6, in this example, the appropriate shingle mask is invoked depending on print direction.

A shingle mask that is 50% depleted is advantageously used for the depleted shingle mask. The overall depletion factor, DF, is given by the formula $$DF(\%) = (P/\text{Threshold Range}) \times \text{Mask Depletion}(\%)$$

where the depletion probability P is given by the depletion probability look-up table, the threshold range is the range of the depletion probability values, and in this case the mask depletion is 50%. For example, given a composite CMY color tone with a depletion probability value of 100, as in the magenta depletion probability for $T_c$=482 in Table 1, where the threshold range is 256, the depletion factor is $(100/256) \times 50\%$ or about 20%. Note that only one depleted shingle mask is needed. The depletion probability value determines the probability with which the depleted shingle mask is invoked, resulting in the desired level of depletion.

The processes described in FIG. 4, including the determination of output level L, may be implemented using a combination of hardware and software, where portions of the hardware/software are located, for example, in computer 22 and other portions located in printer 10. In one embodiment, a program carrying out the processes of FIG. 4 is installed in firmware in printer 10. The determination of output level L is advantageously performed in the same location in which the halftoning process is carried out. The location of the hardware/software for carrying out this method is a matter of design choice. The method can be implemented on conventional current computers and inkjet printers.

While particular embodiments of the present invention have been shown and described, it will be obvious to those skilled in the art that changes and modifications may be made without departing from this invention in its broader aspects. For example, in FIGS. 4 and 5, hue compensation for colors magenta and yellow is illustrated. The application to any other pair of colors and the generalization to three or four colors are readily apparent. Therefore, the appended claims are to encompass within their scope all such changes and modifications as fall within the true spirit and scope of this invention.

What is claimed is:

1. A system for use in printing comprising:
   a look-up table, said look-up table being indexed by a composite color tone value in an image formed by pixels, said look-up table outputting at least one depletion probability value;
   a threshold error term;
   an output level value corresponding to a number of ink drops to be printed by an ink printer for particular ink colors; and
   an incrementor for transforming said output level value into a direction-dependent output level value if said depletion probability value is greater than said threshold error term and if said output level value corresponds to a non-zero number of ink drops.

2. The system of claim 1 wherein said direction-dependent output level value is greater than a maximum original value, before being transformed, of said output level value.

3. The system of claim 2 wherein said incrementor is configured to increment said output level value by a fixed amount.

4. The system of claim 3 wherein said fixed amount is equal to said maximum original value.

5. The system of claim 2 wherein said incrementor is a second look-up table.

6. The system of claim 2 further comprising a printer which receives values corresponding to said output level value and said direction-dependent output level value and prints ink drops on a medium in response thereto.

7. The system of claim 6 wherein said printer comprises color print cartridges which are moved across said medium while printing ink drops on said medium.

8. The system of claim 7 wherein said ink colors include cyan, magenta, and yellow.

9. The system of claim 6 further comprising at least one shingle mask, said shingle mask for controlling the number of ink drops to be printed for a particular ink color at a particular pixel location on said medium each time said print cartridges are moved across said medium.

10. The system of claim 9 wherein said at least one shingle mask comprises first shingle masks corresponding to said output level value less than or equal to said maximum original value and second shingle masks corresponding to said direction-dependent output level value.

11. The system of claim 10 wherein said second shingle masks comprise first-direction masks associated with printing as said color print cartridges are moved across said medium in a first direction and second-direction masks associated with printing as said color print cartridges are moved across said medium in a second direction, wherein said second direction is opposite to said first direction.

12. The system of claim 11 wherein said second-direction masks correspond to printing fewer ink drops than said first-direction masks.

13. The system of claim 1 wherein said at least one depletion probability value comprises a first depletion probability value corresponding to a first color and a second depletion probability value corresponding to a second color.

14. The system of claim 13 wherein said first color is magenta and said second color is yellow.

15. A method of compensating for print-direction induced hue shift in a printer comprising:

generating an output level value in an image formed by pixels, said output level value corresponding to a number of ink drops to be printed by an ink printer for particular ink colors generating a composite color tone value;

indexing a look-up table with said composite color tone value;

outputting by said look-up table at least one depletion probability value; and incrementing said output level value by a fixed amount to transform it into a direction-dependent output level value if said depletion probability value is greater than a threshold error term and if said output level value corresponds to a non-zero number of ink drops.

16. The method of claim 15 wherein said fixed amount is equal to a maximum original value, before being incremented, of said output level value.

17. The method of claim 16 further comprising applying said output level value and said direction-dependent output level value to said printer wherein said printer comprises color print cartridges which are moved across a medium while printing ink drops on said medium.

18. The method of claim 17 further comprising providing at least one shingle mask, said shingle mask for controlling the number of ink drops to be printed for a particular ink color at a particular pixel location on said medium each time said print cartridges are moved across said medium.

19. The method of claim 18 wherein said at least one shingle mask comprises first shingle masks corresponding to said output level values less than or equal to said maximum original value and second shingle masks corresponding to said output level values greater than said maximum original value.

20. The method of claim 19 further comprising applying said at least one shingle mask corresponding to said output level value to said printer.

21. The method of claim 20 wherein said second shingle masks comprise first-direction masks associated with printing as said color print cartridges are moved across said medium in a first direction and second-direction masks associated with printing as said color print cartridges are moved across said medium in a second direction, wherein said second direction is opposite to said first direction.

22. The method of claim 21 wherein said second-direction masks correspond to printing fewer ink drops than said first-direction masks.

23. The method of claim 17 wherein said ink colors include cyan, magenta, and yellow.

24. The method of claim 23 wherein said indexing said look-up table, said outputting at least one depletion probability value, and said incrementing said output level value are only performed if said output level value corresponds to color magenta or color yellow.

* * * * *